US012771126B2

(12) United States Patent
Stragies et al.

(10) Patent No.: US 12,771,126 B2
(45) Date of Patent: Oct. 20, 2026

(54) FIELD DEVICE FOR PROVIDING A SENSOR UNIT WITH ENERGY FROM A NETWORK

(71) Applicant: ABB Schweiz AG, Baden (CH)

(72) Inventors: Michael Stragies, Göttingen (DE); Georg Horst, Northeim (DE); Frank Wiederhold, Hofgeismar (DE)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 19/295,042

(22) Filed: Aug. 8, 2025

(65) Prior Publication Data

US 2026/0045789 A1 Feb. 12, 2026

(30) Foreign Application Priority Data

Aug. 9, 2024 (EP) .................................... 24193856
Oct. 11, 2024 (EP) .................................... 24206192

(51) Int. Cl.
*H02J 1/06* (2026.01)
*H02J 105/40* (2026.01)
*H04L 12/10* (2006.01)

(52) U.S. Cl.
CPC ................ *H02J 1/06* (2013.01); *H04L 12/10* (2013.01); *H02J 2105/40* (2026.01)

(58) Field of Classification Search
CPC .......... H02J 1/06; H02J 2105/40; H02J 1/002; H04L 12/10; H02M 7/04; G05F 3/16; G05F 1/561; G05F 1/565
See application file for complete search history.

(56) References Cited

U.S. PATENT DOCUMENTS 5,345,166 A * 9/1994 Leonard ............... H03K 17/951 361/179
9,484,834 B2 * 11/2016 Weis .................... H03K 17/102
(Continued)

FOREIGN PATENT DOCUMENTS

DE 102021106808 A1 9/2022
WO WO 2017/066496 A1 4/2017

OTHER PUBLICATIONS

European Patent Office, Extended European Search Report in European Patent Application No. 24206192.7, 5 pp. (Mar. 24, 2025).

*Primary Examiner* — Regis J Betsch
*Assistant Examiner* — Alex W Lam
(74) *Attorney, Agent, or Firm* — Fitch Even Tabin & Flannery LLP

(57) ABSTRACT

A field device having first and second input terminals connected to first and second wires of a network; first and second output terminals connected to first and second wires of a sensor unit; a rectifier unit having a first part arranged between the first input terminal and a first node and a second part arranged between the second input terminal and a second node, wherein the first node is connected to the first output terminal. A current measurement device measures a current between the second node and a third node. A voltage measurement device measures a voltage between the first node and the second node. A first semiconductor is arranged between the first node and the third node and configured to pass a bypass current so that the measured current comprises a two-part curve; and a second semiconductor arranged between the third node and the second output terminal.

9 Claims, 3 Drawing Sheets

(56) References Cited

U.S. PATENT DOCUMENTS

| | | | | |
|---|---|---|---|---|
| 2017/0041153 | A1* | 2/2017 | Picard | H04L 12/10 |
| 2017/0267111 | A1* | 9/2017 | Ochi | B60L 53/126 |
| 2022/0273303 | A1* | 9/2022 | Creamer | A61B 17/072 |

* cited by examiner

FIELD DEVICE FOR PROVIDING A SENSOR UNIT WITH ENERGY FROM A NETWORK

CROSS-REFERENCE TO RELATED APPLICATIONS

The instant application claims priority to European Patent Application No. 24193856.2, filed Aug. 9, 2024, and to European Patent Application No. 24206192.7, filed Oct. 11, 2024, each of which is incorporated herein in its entirety by reference.

FIELD OF THE DISCLOSURE

The present disclosure generally relates to field devices and, more particularly, to field devices that provide energy from a network to a sensor unit.

BACKGROUND OF THE INVENTION

Several types of networks are able and defined for providing a device that is connected to one of said network with energy. Examples may comprise networks that provide Ethernet connectivity and are applicable for 2-wire Ethernet topologies, such as Ethernet APL (Advanced Physical Layer) or Ethernet SPE (Single Pair Ethernet) networks. However, these networks have some divergent specifications, e.g. a differing supply voltage, and other restrictions, e.g. a minimum current that needs to flow through each field device that is connected to one of said network. Hence, it would be desirable to have a field device, which can deal with at least both network types and fulfils both specifications.

BRIEF SUMMARY OF THE INVENTION

The present disclosure generally describes a field device that is connectable to both Ethernet APL (Advanced Physical Layer) and Ethernet SPE (Single Pair Ethernet) networks. This objective is achieved by the subject-matter of the independent claims. Further embodiments are evident from the dependent claims and the following description.

In one aspect, the present disclosure describes a field device that is designed for providing a sensor unit with energy from a 2-wire network. The field device comprises: a first input terminal, configured for being connected to a first wire of the network; a second input terminal, configured for being connected to a second wire of the network; a first output terminal, configured for being connected to a first wire of the sensor unit; a second output terminal, configured for being connected to a second wire of the sensor unit; a rectifier unit, whose first part is arranged between the first input terminal and a first node and whose second part is arranged between the second input terminal and a second node, wherein the first node is connected to the first output terminal; a current measurement device, arranged between the second node and a third node, for measuring a measured current between the second node and the third node; a voltage measurement device for measuring a measured voltage between the first node and the second node; a first semiconductor, arranged between the first node and the third node and configured for passing through a bypass current through the first semiconductor, so that the measured current, which is a sum of the bypass current and a load current through the sensor unit, comprises a two-part curve, with a negative linear current-voltage-correlation in a lower voltage-section and a constant current in an upper voltage-section; and a second semiconductor, arranged between the third node and the second output terminal.

BRIEF DESCRIPTION OF THE SEVERAL VIEWS OF THE DRAWING(S)

DETAILED DESCRIPTION OF THE INVENTION

Figure 1:
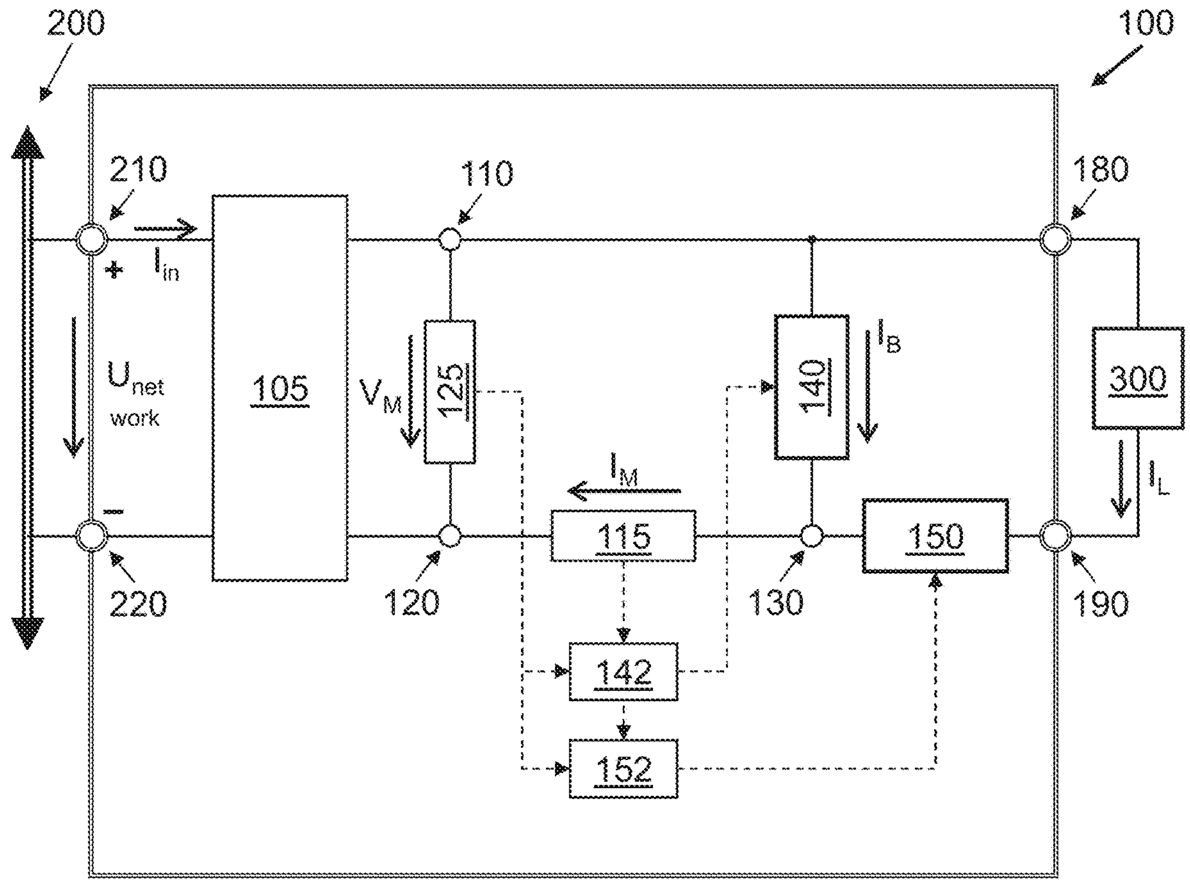
FIG. 1 is a schematic diagram of a field device in accordance with the disclosure.

FIG. 1 schematically shows a field device 100, which is arranged between a network 200 and a sensor unit 300. The field device 100 provides the sensor unit 300 with energy from the network 200. The energy from the network 200 may be the only power supply of the sensor unit 300. The sensor unit 300 is supplied via output terminals 180 and 190. The sensor unit 300 may be a separate device or may be integrated into the field device 100. The sensor unit 300 may be detachably coupled to the field device 100. The network 200 may be an Ethernet-based network, for instance Ethernet APL, Ethernet SPE, or another type of 2-wire network. The field device 100 is connected to the network 200 via terminals 210 and 220. The terminals 210 and 220 may be realized, e.g., as screw or clamping terminal or via an M8 or M12 connector.

The terminals 210 and 220 are connected to a rectifier unit 105, which is arranged between the network 200 (or: the terminals 210 and 220) and a first node 110. Between the second node 120 and a third node 130, a current measurement device 115 is arranged. The current measurement device 115 measures a measured current $I_M$ between the second node 120 and a third node 130. This current $I_M$ may be essentially the total current through the sensor unit 300 plus through the controlling devices, i.e. through a first semiconductor 140 and a second semiconductor 150, plus some minor consumers. The field device further comprises a voltage measurement device 125 for measuring a measured voltage $V_M$ between the first node 110 and the second node 120.

The first semiconductor 140 is arranged between the first node 110 and the third node 130 and, thus, essentially parallel to the sensor unit 300. The second semiconductor 150 is arranged between the third node 130 and the second output terminal 190 and is controlled by a second control unit 152. The first semiconductor 140 is configured for passing through a bypass current $I_B$ through the first semiconductor 140, thus controlling the measured current $I_M$, which is a sum of the bypass current $I_B$ and a load current $I_L$ through the sensor unit 300. The first semiconductor 140 is controlled by a first control unit 142, which uses the measured voltage $V_M$ and the measured current $I_M$ as inputs. The first control unit 142 controls the bypass current $I_B$ through the first semiconductor 140 in a way that a current-voltage-correlation can be reached, as shown in FIG. 2.

Figure 2:
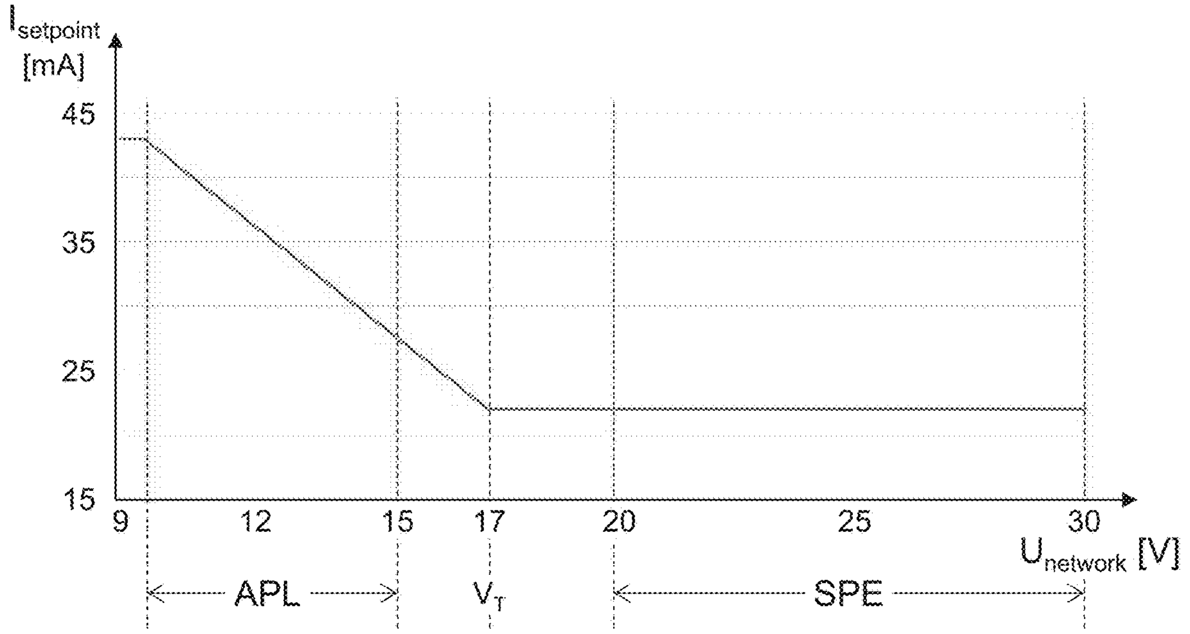
FIG. 2 is a graph of a dependency of a maximum setup-current from a voltage of the network according to an embodiment of the present disclosure.

FIG. 2 shows an exemplary dependency of a maximum setpoint-current $I_{setpoint}$ on a voltage $U_{network}$ of the network according to an embodiment. In the example shown, a control function for a field device is depicted, which supports both an Ethernet APL network (type A), with a voltage range between 9.6 V and 15 V, and an Ethernet SPE, with a voltage range between 20 V and 30 V. The control function comprises a two-part curve. This two-part curve has a lower voltage-section—in FIG. 2 between 9.6 V and a kink voltage $V_T$, between terminals 210 and 220, of (exemplarily) 17 V. In the lower voltage-section, a negative linear current-voltage-correlation can be seen, with a maximum current of 43 mA at 9.6 V, and a minimum current of 22 mA at 17 V, and linearly decreasing between these points. In an upper voltage-section, which follows the lower voltage-section, a constant current of 22 mA can be seen, spreading from the kink voltage $V_T$ of (exemplarily) 17 V up to the maximum supported voltage of 30 V. The current at the input terminals 210 and 220 may be selected depending on the power $P_{input}$ at the terminals 210 and 220, to support—by means of the field device 100—the sensor unit 300 at the terminals 180 and 190.

For example, for $P_{input}$=375 mW, with an input voltage $U_{network}$ of 9 V at the terminals 210 and 220, the required input current $I_{in}$ would be:

$$I_{in} = 375\ \text{mW}/9\ \text{V} \approx 42\ \text{mA}$$

Under this assumption, the kink voltage $V_T$ is, then, selected in a way to get a similar power $P_{input}$ at $V_T$ for a selected current $I_L$. For example, for a current of $I_L$=22 mA, the kink voltage $V_T$ is:

$$V_T = 375\ \text{mW}/22\ \text{mA} \approx 17\ \text{V}$$

This example is only a rough computation example of the values of interest. Particularly, the power for the controlling components of the field device 100, e.g. the first and second control unit 142 and 152, is neglected. For a detailed computation, additional factors—e.g. selection tolerances, temperature drift and/or further aspects—may be considered. It is also possible to select different input powers at both ends of the lower voltage section because of any reason, for example 400 mW at the lower end (e.g. at 9.6 V) and 450 mW at the upper end (e.g. at 22.5 V). Applied to this example, the current at the lower end would be about 400 mW/9.6 V≈42 mA and the voltage at the upper end and for 22 mA would be about 450 mW/22 mA≈20.5 V.

Figure 3:
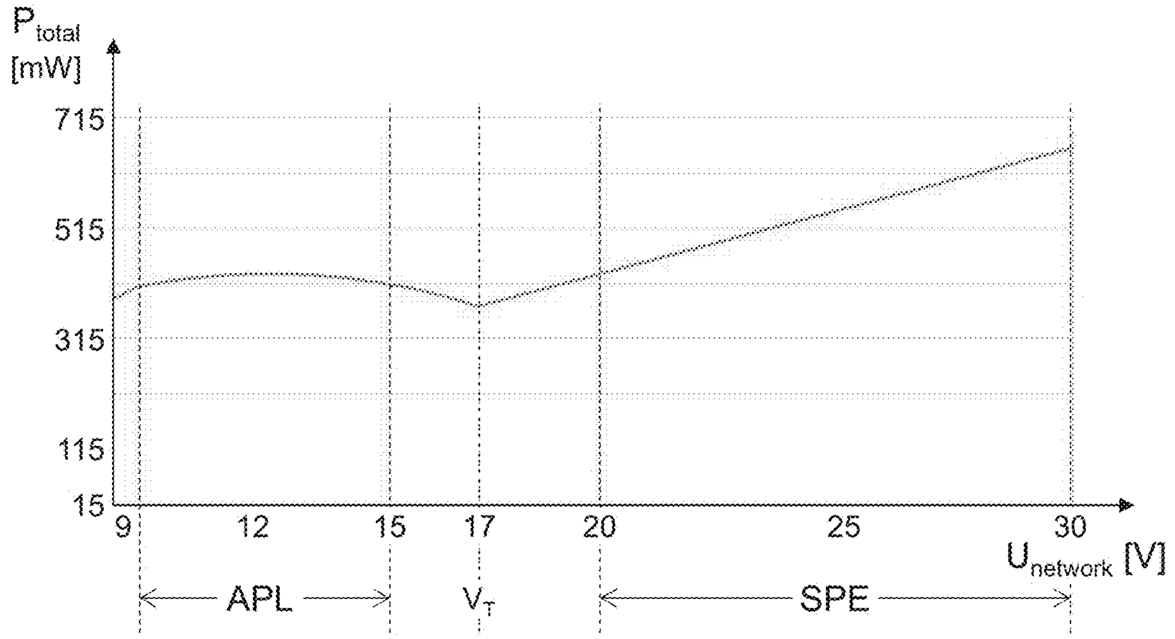
FIG. 3 is a graph of a dependency of a maximum power of the field device from a voltage of the network according to an embodiment of the present disclosure.

Results of selecting the diagram of FIG. 2 as a control curve are depicted in FIG. 3. FIG. 3 shows an exemplary dependency of a maximum power of the field device 100 on a voltage $U_{network}$ of the network according to an embodiment, based on the control curve of FIG. 2. The power consumed in the field device 100 is essentially a product of $V_M$ and $I_M$ (neglecting some minor consumers). As can be seen in FIG. 3, the current control curve of FIG. 2 leads to a quite stable power consumption over the complete lower voltage-section. The curve of FIG. 3 may also be considered when selecting the kink voltage $V_T$: This voltage $V_T$ may be selected in a way that the power consumed at $V_T$ is roughly the same as the power consumed at the lowest voltage of the lower voltage-section.

When looking at FIG. 3, it can clearly be seen that the quite easy-to-implement control curve of FIG. 2 leads to a quite stable power consumption over the complete lower voltage-section. Furthermore, the control can be very fast, so that the current changes caused by the field device have no higher current change rate than 10 mA/ms (as specified for at least some Ethernet-based networks), usually significantly below this. On the other hand, it turned out that the linear control curve is a measure that reduces the risk of an oscillating control significantly. Besides, this field device can be used for a broad voltage range. Thus, it can advantageously be connected to a broad range of Ethernet-based network types and/or sub-types, as exemplarily shown for Ethernet APL and Ethernet SPE networks.

Figure 4:
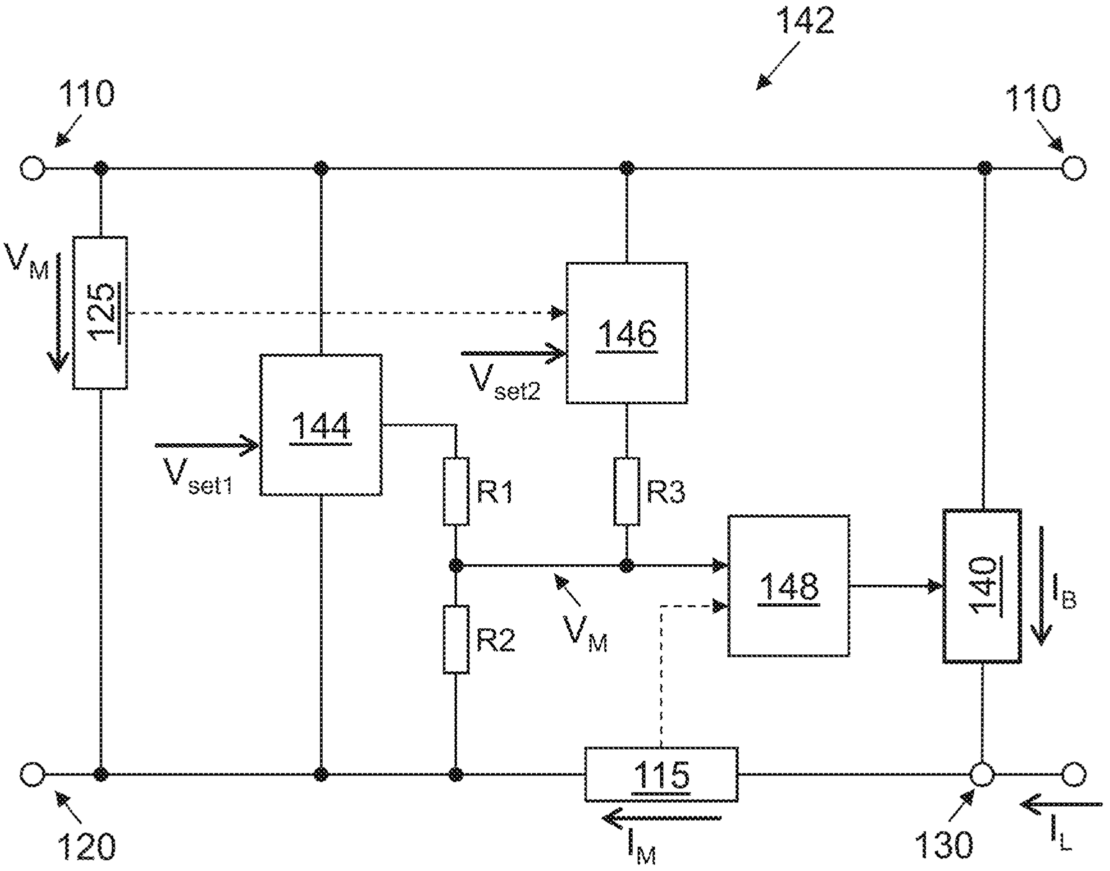
FIG. 4 is a schematic diagram of a control unit according to an embodiment of the present disclosure.

FIG. 4 shows an exemplary implementation of a control unit 142 according to an embodiment. The first control unit 142 comprises a Y-shaped resistor network, whose middle node M is led to a controller 148, which controls the first semiconductor 140 (see FIG. 1). A second input of the controller 148 is connected to current measurement device 115. The current measurement device 115 measures the measured current $I_M$, which is a sum of a bypass current $I_B$, through the first semiconductor 140, and a load current $I_L$, through the sensor unit 300 (see FIG. 1). A left branch of the Y-shaped resistor network comprises resistors R1 and R2 in series, which builds a voltage divider of a constant voltage from a voltage reference 144. R1 may be significantly higher than R2. Setpoint $V_{set1}$ sets a value that determines the constant current for the upper voltage-section. A left branch of the Y-shaped resistor network comprises resistor R3 (and common resistor R2), R3 in series with a setpoint adjustment unit 146. The setpoint adjustment unit 146 adjusts the setpoint voltage $V_{set2}$ by means of R3, for the lower voltage-section, so that the first semiconductor 140, for this voltage-section, is only controlled by the left branch of the Y-shaped resistor network. The setpoint adjustment unit 146 has an input $V_{set2}$, which sets the kink voltage $V_T$, from which point the resistance through setpoint adjustment unit 146 is decreased, so that the linear curve of the lower voltage-section can be implemented. The other input of the setpoint adjustment unit 146 compares the voltage $V_{set2}$ with the measured (actual) voltage $V_M$.

In the context of the present disclosure, the field device may be designed as a kind of "field device core" or "electrical intermediate piece" between the Ethernet-based network and the sensor unit. The Ethernet-based network may be, e.g., an Ethernet APL (Advanced Physical Layer) or an Ethernet SPE (Single Pair Ethernet) network. The supply voltage of the Ethernet APL is defined between 9.6 V and 15 V, and the supply voltage of the Ethernet SPE (port classes 10, 11, 12) is defined between 20 V and 30 V. Other types of Ethernet SPE may have higher voltages. Each field device that is connected to these types of Ethernet-based network needs to fulfil at least a certain set of restrictions, to guarantee a well-working network system. These restrictions may comprise that current change caused by a field device connected to this network should not have a higher current change rate than 10 mA/ms. Further restrictions may apply as well. Since not all sensor units can guarantee this, measures need to be taken to comply with these restrictions.

The first input terminal and the second input terminal may be connected to the network, e.g., via clamps and/or other types of connectors.

The sensor unit—or "load"—may be configured for performing measurements, in at least some cases including evaluating the measurements, of, e.g., temperature, pressure, flow, and/or distance. The sensor unit may comprise a sensor frontend, e.g. for said applications, and/or a display for displaying any kind of value and/or graphics, particularly measurement values. The sensor unit may comprise a processor, e.g. with memory, which may serve as a control unit, as a data processing unit and/or for other purposes, e.g. for programming EEPROMS. Hence, the sensor unit may, on the one hand, have fluctuating current, while the Ethernet-based network defines a minimum and a maximum current that can (and/or needs to) be delivered to each sensor unit that is connected to this network.

The rectifier unit may comprise a bridge rectifier or a serial diode. The rectifier may comprise measures that provide a constant current.

The current measurement device may be implemented as a serial or "shunt" resistor, as a Hall sensor and/or as another type of device. The current measurement device measures a current that passes both through the sensor unit and through the controlling components (e.g. first and second semiconductor) of the field device.

The voltage measurement device may be a high-impedance device. The voltage measurement device is configured for measuring a measured voltage between the first node and the second node.

The first semiconductor is arranged between the first node and the third node and is essential parallel to the load or sensor unit. The first semiconductor is configured for passing through a bypass current through the first semiconductor; this current may be controlled by a first control unit. The controlling may be designed in a way that the measured current, which is a sum of the bypass current and a load current through the sensor unit, is controlled by controlling the bypass current. The measured current may be called the target value of this controlled field device. The measured current can be depicted by a two-part curve, e.g. the one shown in FIG. 2. The first part or lower voltage-section part of said curve has a negative linear current-voltage-correlation, i.e. this part is a linear decreasing function, with a current that is the lower the higher the voltage from the network is, in other words to decrease the current linear with the increasing voltage, until the current reaches his lower limit. The second part or upper voltage-section part of the curve has a constant current, i.e. the measured current stays the same in this section. In addition, a lowest voltage-section may be realized, with a constant current for voltages below the lower voltage-section part. This may be realized within the first control unit and may be implemented by a resistor network including active parts like op-amps.

The second semiconductor is arranged between the third node and the second output terminal. It may advantageously be used to limit the current through the sensor unit.

This field device may support a broad voltage range. Thus, it can advantageously be connected to a broad range of Ethernet-based network types and/or sub-types. Particularly, this field device can advantageously be connected to both Ethernet APL (Advanced Physical Layer) and Ethernet SPE (Single Pair Ethernet) networks. Furthermore, the field device fulfils the restriction of a current change rate that is not higher than 10 mA/ms, the current change rate caused by the field device plus the sensor unit, which may be connected to this network as a kind of system. And, the linear current-voltage-correlation allows an implementation in a circuit with linear parts, so that the implementation can be comparably simple. And, a fast control can be implemented, having nevertheless a low risk of an oscillating control loop. In addition, the field device can realize—e.g. in the APL voltage range—a relatively constant power consumption. This may be particularly advantageous for field devices that need to fulfil "Ex" (explosive environment) specifications, e.g. by keeping the overall heating of the device small, which may contribute for complying with an Ex-temperature-rating, particularly due to a lower power consumption.

In various embodiments, the second semiconductor is configured for being initially closed and for opening slowly during a start-up phase. "Initially" may mean: right after having turned on the field device or, e.g., after a hardware reset. Opening slowly (i.e. some ms) may be realized by an RC-component, possibly connected to an amplifier.

In various embodiments, the second semiconductor is further configured for limiting the measured current. This may be particularly advantageous in a case of a fault in the sensor unit.

In various embodiments, the network is an Ethernet-based network, particularly a 2-wire Ethernet-based network, for instance an Ethernet APL network or an Ethernet SPE network. These networks define sub-types. The field device may be configured for being connected to one or more sub-types of these networks.

These networks may enable providing the field device's power only from the Ethernet-based network. Due to this, additional power supply units may become obsolete. Specifications of such networks may be found, e.g., in IEEE Standard for Ethernet Amendment 5: "Physical Layers Specifications and Management Parameters for 10 Mb/s Operation and Associated Power Delivery over a Single Balanced Pair of Conductors". For example, the Ethernet-based APL (Advanced Physical Layer) is defined for a voltage range between 9.6 V and 15 V, the Ethernet-based SPE (Single Pair Ethernet) is defined for a voltage range between 20 V and 30 V, for port classes 10, 11, and 12. This may allow use of one design for multiple 2-wire network standards.

In various embodiments, a kink voltage, which defines a kink in a control curve, is a voltage between a voltage range of the Ethernet APL network and a voltage range of the Ethernet SPE network, wherein the control curve implements a dependency of a maximum setpoint-current on a network voltage. An example of such a control curve is depicted in FIG. 2. The Ethernet APL network—A or C type—is defined for a voltage range between 9.6 V and 15 V, or between 11.61 V and 15 V, respectively. The Ethernet SPE network is defined for a voltage range between 20 V and 30 V. Hence, when the field device is to support both of these networks, the kink voltage would be any voltage between 15 V and 20 V (or, in some cases, higher), e.g. 17 V, 18 V, etc. Below the kink voltage, a negative linear correlation between the maximum setpoint-current and the network voltage may be implemented, and above the kink voltage, a constant correlation between the maximum setpoint-current and the network voltage may be implemented.

In various embodiments, the network has a voltage range between 5 V and 50 V, particularly between 9 V and 30 V. Basically, the field device described above and/or below may be used for a broad range of field devices. This broad range may be limited, e.g., by the voltage range of the semiconductors that are used for the field device and/or by cost or cost-effectiveness considerations. The control curve with the kink between two voltage sub-ranges (e.g. a lower and an upper voltage range) may advantageously contribute that the field device can be used within such a broad voltage range of the network.

In various embodiments, the first semiconductor is further configured for realizing that the measured current is not lower than a lower current limit. The lower current limit may be defined by the network, e.g. a minimum current that needs to flow through each field device that is connected to said network. Some networks may, e.g., define a minimum current of—say—10 mA, to make it easier to differentiate connected devices from not-connected devices, and/or for a higher stability and/or less current-fluctuation within the network.

In various embodiments, the first semiconductor is further configured for realizing that the bypass current is not higher than a maximum current, the maximum current being defined by a maximum allowed power dissipation of the first semiconductor. This may advantageously save the first semiconductor from a damage and/or early degradation by heat.

In various embodiments, the first semiconductor and/or the second semiconductor is a bipolar semiconductor, a MOSFET, a PMOS and/or an NMOS semiconductor. NMOS semiconductors may be preferred by their electric characteristic and/or because, usually, a broader range of NMOS semiconductors may be available than of PMOS semiconductors.

An aspect relates to a field device system, comprising a field device as described above and/or below and a sensor unit as described above and/or below. The sensor unit may be adapted to the field device, e.g. specified for a predefined voltage range and/or current range.

An aspect relates to a use of a field device as described above and/or below for providing a sensor unit with energy from a network, particularly from an Ethernet-based network.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

LIST OF REFERENCE SYMBOLS

100 field device
105 rectifier unit
110 first node
115 current measurement device
120 second node
125 voltage measurement device
140 first semiconductor
142 first control unit
144 voltage reference
146 setpoint adjustment unit
148 controller
150 second semiconductor
152 second control unit
160 reference node
170 controller
180 first output terminal
190 second output terminal
200 network
210 first input terminal
220 second input terminal
300 sensor unit, load

What is claimed is:

1. A field device configured for providing a sensor unit with energy from a 2-wire network, the field device comprising:

- a first input terminal configured for being connected to a first wire of the network;
- a second input terminal configured for being connected to a second wire of the network;
- a first output terminal configured for being connected to a first wire of the sensor unit;
- a second output terminal configured for being connected to a second wire of the sensor unit;
- a rectifier unit having a first part arranged between the first input terminal and a first node, and a second part is arranged between the second input terminal and a second node, wherein the first node is connected to the first output terminal;
- a current measurement device arranged between the second node and a third node, the current measurement device configured for measuring a measured current between the second node and the third node;
- a voltage measurement device configured for measuring a measured voltage between the first node and the second node;
- a first semiconductor arranged between the first node and the third node, the first semiconductor configured for passing a bypass current through the first semiconductor, wherein the measured current, which is a sum of the bypass current and a load current through the sensor unit, comprises a two-part curve, with a negative linear current-voltage-correlation in a lower voltage-section and a constant current in an upper voltage-section; and
- a second semiconductor arranged between the third node and the second output terminal.

2. The field device of claim 1, wherein the second semiconductor is configured for being initially closed and for opening slowly during a start-up phase.

3. The field device of claim 1, wherein the second semiconductor is configured for limiting the measured current.

4. The field device of claim 1, wherein the network is an Ethernet APL network or an Ethernet SPE network.

5. The field device of claim 4, wherein a kink voltage, which defines a kink in a control curve, is a voltage between a voltage range of the Ethernet APL network and a voltage range of the Ethernet SPE network, and wherein the control curve implementing a dependency of a maximum setpoint-current on a network voltage.

6. The field device of claim 1, wherein the network voltage of the network has a voltage range between 5 V and 50 V.

7. The field device of claim 1, wherein the first semiconductor is further configured for realizing that the measured current is not lower than a lower current limit.

8. The field device of claim 1, wherein the first semiconductor is further configured for realizing that the bypass current is not higher than a maximum allowed power dissipation of the first semiconductor.

9. The field device of claim 1, wherein the first semiconductor and/or the second semiconductor is one of a bipolar, a MOSFET, a PMOS and/or an NMOS semiconductor.

* * * * *